United States Patent
Liubakka et al.

(10) Patent No.: US 6,173,223 B1
(45) Date of Patent: Jan. 9, 2001

(54) STEERING CONTROL METHOD FOR PROVIDING VARIABLE ASSIST POWER STEERING

(75) Inventors: Michael Kenneth Liubakka, Livonia; Robert Charles Baraszu; Ronald Joseph Collins, both of Dearborn, all of MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/226,235

(22) Filed: Jan. 5, 1999

(51) Int. Cl.[7] .................................................. B62D 5/065
(52) U.S. Cl. ............................................. 701/42; 180/422
(58) Field of Search ................................. 701/41, 42, 43; 180/417, 421, 422, 446

(56) References Cited

U.S. PATENT DOCUMENTS

| | | | |
|---|---|---|---|
| 4,621,833 | * 11/1986 | Soltis | 280/5.51 |
| 4,666,011 | 5/1987 | Ohe et al. | 180/446 |
| 4,715,461 | 12/1987 | Shimizu | 180/446 |
| 4,715,463 | 12/1987 | Shimizu | 180/446 |
| 4,800,974 | 1/1989 | Wand et al. | 180/446 |
| 4,819,170 | 4/1989 | Shimizu et al. | 701/41 |
| 4,828,065 | 5/1989 | Ishihara et al. | 180/422 |
| 5,029,660 | * 7/1991 | Raad et al. | 180/422 |
| 5,201,818 | 4/1993 | Nishimoto | 180/446 |
| 5,257,828 | 11/1993 | Miller et al. | 180/446 |
| 5,265,019 | 11/1993 | Hararra et al. | 701/41 |
| 5,475,289 | 12/1995 | McLaughlin et al. | 318/432 |
| 5,513,720 | 5/1996 | Yamamoto et al. | 180/421 |
| 5,528,497 | 6/1996 | Yamamoto et al. | 701/41 |
| 5,553,683 | 9/1996 | Wenzel et al. | 180/417 |
| 5,568,389 | 10/1996 | McLaughlin et al. | 701/41 |
| 5,623,409 | 4/1997 | Miller | 701/41 |
| 5,709,281 | 1/1998 | Sherwin et al. | 180/272 |
| 5,711,394 | 1/1998 | Fujii et al. | 180/422 |
| 5,743,351 | 4/1998 | McLaughlin | 180/446 |
| 5,749,431 | 5/1998 | Peterson | 180/422 |

* cited by examiner

*Primary Examiner*—William A. Cuchlinski, Jr.
*Assistant Examiner*—Edward Pipala
(74) *Attorney, Agent, or Firm*—Gregory P. Brown

(57) ABSTRACT

A variable assist power steering system (10) uses vehicle speed and steering wheel rate to vary the steering assist provided. A control module (30) receives vehicle speed and steering wheel rate data from sensors (24, 25) and produces a control signal for a flow control valve actuator (32) that bypasses fluid flow from the pump (22) to a reservoir (36), rather than to the steering valve (20) thereby affecting steering valve pressure which controls the rack piston (16) which changes the angle of the front vehicle wheels used for steering. The control module (30) employs first and second calibration tables (38, 40) to determine base and evasive desired actuator current values and then selects a final desired actuator current value using these values in combination with the steering wheel rate data.

20 Claims, 7 Drawing Sheets

STEERING CONTROL METHOD FOR PROVIDING VARIABLE ASSIST POWER STEERING

FIELD OF THE INVENTION

This invention relates generally to power steering for motor vehicles, and, more particularly, to steering control systems for varying the amount of steering assist provided.

BACKGROUND OF THE INVENTION

The amount of force output required by a steering system is proportional to the lateral load on the front axle. At speed, the lateral load is generated primarily by the lateral acceleration of the vehicle. The force output of the power steering system is generated by the assist pressure and force input by the driver. The type of steering maneuver a vehicle is performing can be determined by observing the assist pressure, its change with time, the rate at which the steering wheel is being turned and the vehicle speed. With this information a variable assist power steering system can provide the optimum input force to output force relationship for a given steering maneuver. Unfortunately, conventional variable assist power steering systems do not take full advantage of this information as input to the electronic control module. The result has been power steering systems that are slow to provide adequate flow during certain steering maneuvers, resulting in a perceptable increase in effort for a short period of time. For instance, to avoid this, some steering systems provide surplus flow at the pump and then limit the hydraulic flow at the valve. This results in greater parasitic losses of the vehicles engine possibly leading to a decrease in potential fuel economy. Accordingly, it will be appreciated that it would be highly desirable to have a power steering system that more efficiently uses the available control inputs to more optimally deliver variable power steering assist while maintaining smooth steering assist, even during dynamic steering actuation.

SUMMARY OF THE INVENTION

The present invention is directed to overcoming one or more of the problems set forth above. Briefly summarized, according to one aspect of the present invention, a method for providing variable assist power steering by controlling a flow control valve actuator for varying steering assist fluid flow in a power steering system for a vehicle, comprises the steps of: sensing vehicle speed; sensing steering wheel rate; sensing actual actuator current; setting up a first calibration table containing entries representing base actuator current values for given vehicle speeds; setting up a second calibration table containing entries representing evasive actuator current values for given vehicle speeds; selecting a base actuator current from said first calibration table as a function of vehicle speed and producing a base desired current value; selecting an evasive actuator current from said second calibration table as a function of vehicle speed and producing an evasive desired current value; defining a plurality of steering wheel rate ranges; selecting a steering wheel rate range as a function of steering wheel rate; selecting a formula from a plurality of formulas for calculating a final desired current value as a function of steering wheel rate range; calculating said final desired current value using said selected formula; computing flow control valve actuator commands using said final desired current value and generating an output PWM voltage signal; and outputting said PWM voltage signal to said flow control valve actuator to vary steering assist.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
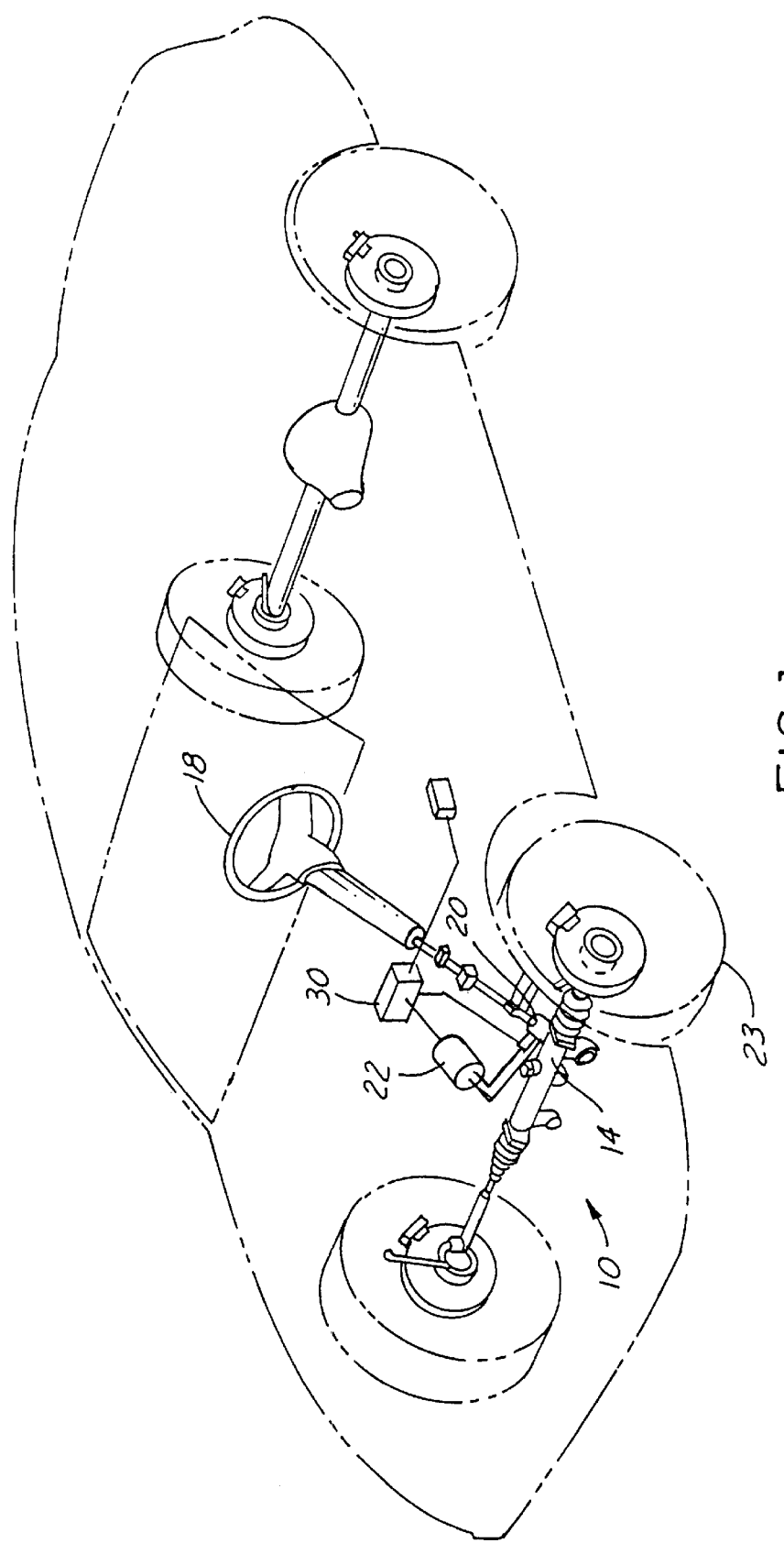
FIG. 1 a diagrammatic perspective view of a vehicle equipped with a variable assist power steering system according to the present invention.
Figure 2:
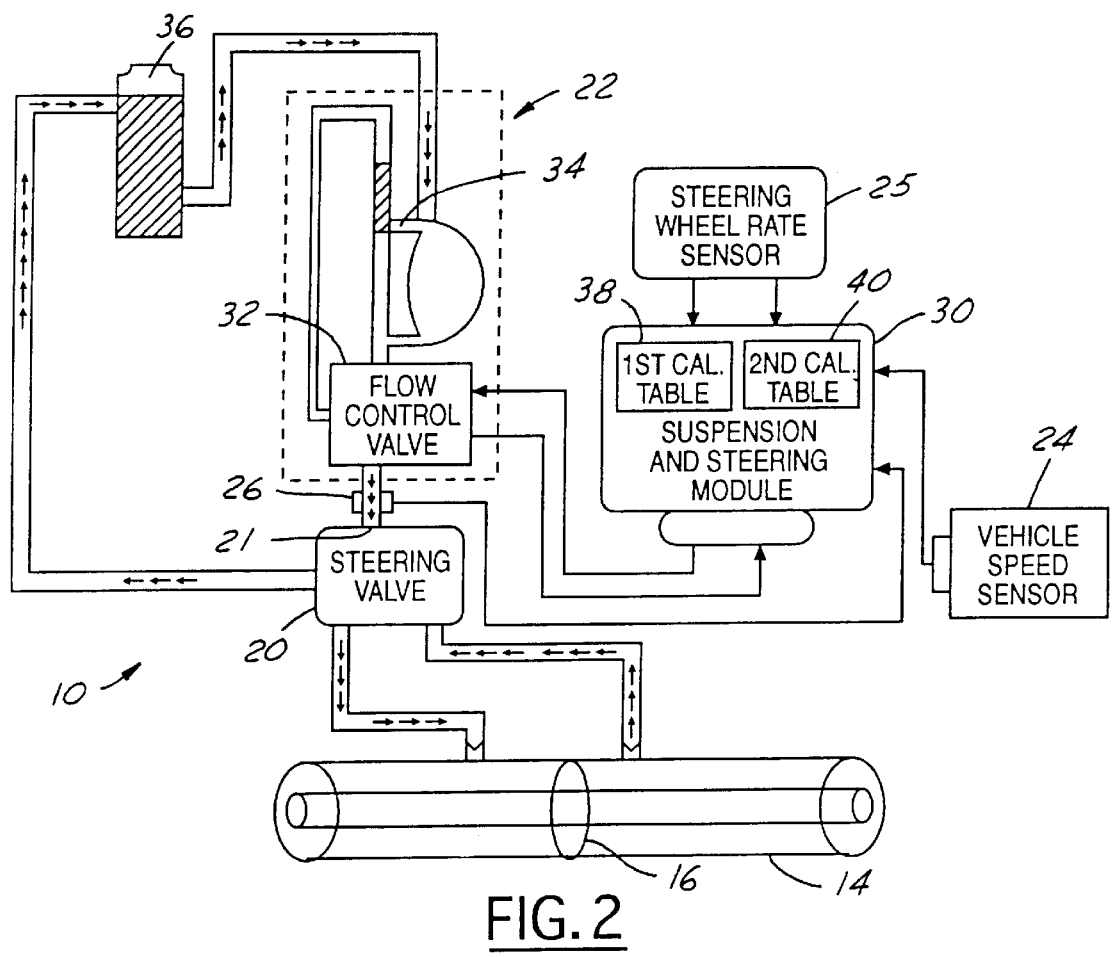
FIG. 2 is a block diagram illustrating the steering system of FIG. 1.

Referring to FIGS. 1–2, a variable assist power steering system 10 for a vehicle has a steering rack assembly 14 that has a piston 16 and is coupled to a steering wheel 18 to steer the vehicle in response to movement of the steering wheel 18. A steering valve 20 has an inlet 21 for receiving pressurized fluid from a pump 22 for effecting displacement of the piston 16 within. As the piston 16 moves, the angle of the front wheels 23 of the vehicle change to alter the path of the vehicle. The steering valve 20 meters fluid to the piston 16 in response to movement of the steering wheel thereby providing steering assist. In effect, the variable assist power steering system multiplies steering wheel torque applied by the driver so that altering the vehicle path is less burdensome to the driver. While the presently preferred embodiment will be described in the context of a rack and pinion steering gear, it should be understood that the present invention applies equally to other types of hydraulically assisted steering systems, including for example those having recirculating ball type steering gears.

The mechanical and hydraulic elements of the steering system are conventional. An example of the hydraulic pump 22 may be found in U.S. Pat. No. 5,029,660 to Raad, et al., issued Jul. 9, 1991 and assigned to the assignee of the present invention. It should be noted that the hydraulic pump can be driven by the engine, or alternatively by an electric motor.

Sensors are used to detect, sense or measure various vehicle operating conditions including vehicle speed, steering wheel rate and fluid pressure. Speed sensor 24 may be of any variety typically used to sense vehicle speed, but a sensor not subject to wheel slip is preferred. A signal generator driven by the power train of the vehicle is one such sensor, and a radar unit is another. Speed sensor 24 forms a means for sensing vehicle speed and producing a vehicle speed signal. A conventional pressure sensor 26 provides a means for sensing steering system fluid pressure at the inlet 21 to the steering valve 20 and producing an inlet fluid pressure signal. It should be noted that there are many equivalent alternatives to sensing pressure for use in the present invention. For instance, it would be functionally equivalent to measure steering torque, differential pressure or steering gear forces instead of inlet pressure, however, these would likely be more costly.

Figure 4:
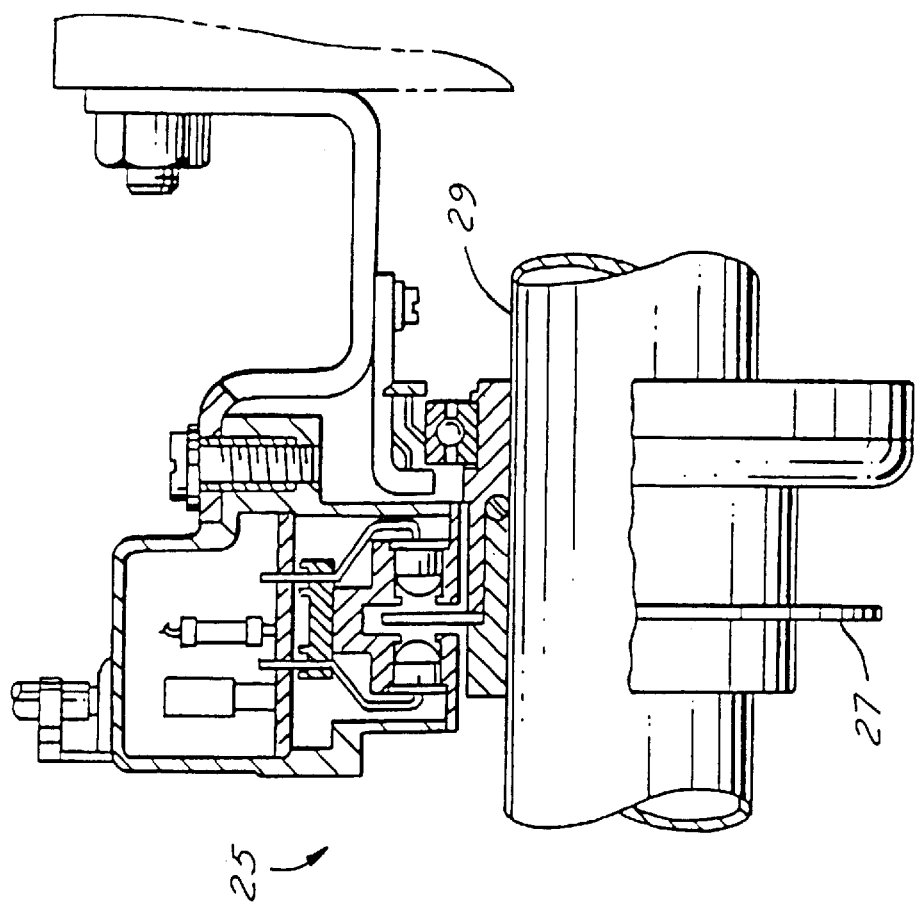
FIG. 4 is a elevational view of a steering wheel rate sensor for use in accordance with the present invention.
Figure 3:
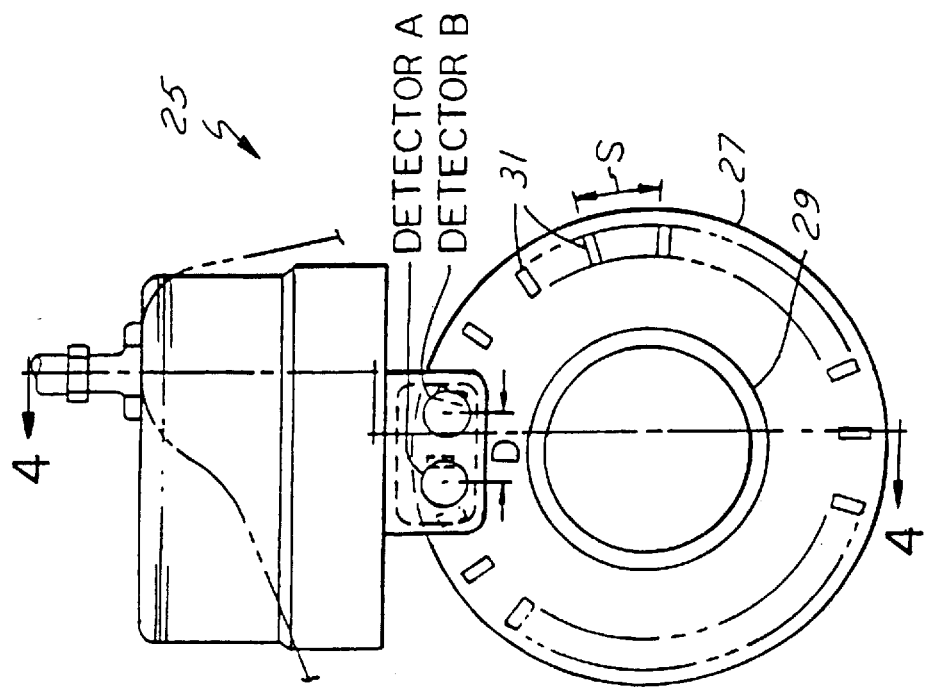
FIG. 3 is a front view of a steering wheel rate sensor for use in accordance with the present invention.

The steering wheel rate sensor 25 is shown in FIGS. 3 and 4. Usage of the illustrated steering wheel sensor is explained in U.S. Pat. No. 4,621,833 to Soltis, issued Nov. 11, 1986, which is assigned to the assignee of the present invention. The steering wheel rate sensor 25 comprises shutter wheel 27, attached to steering shaft 29, which rotates in unison with the steering wheel 18 as the steering wheel is turned by the operator of the vehicle. Shutter wheel 27 has a plurality of apertures 31, in this case 20 in number, which apertures serve to trigger the activity of detectors A and B as the shutter wheel is rotated with the steering system of the vehicle. Because there are 20 apertures contained within shutter wheel 27, the steering wheel sensor 25 provides a signal 80 times during one revolution of the steering wheel and as a result each of the 80 signals or steps indicates 4.5 degrees of rotation of the steering system. It should be recognized that higher resolution may be obtained by increasing the number of apertures.

The outputs of detectors A and B are fed into control module 30 and the steering wheel rate is determined by tracking the rotations of the shutter wheel for a predetermined sampling period. Those skilled in the art will appreciate in view of this disclosure that the illustrated steering wheel rate sensor is exemplary of a class of devices which may be used for the purpose of determining the steering wheel rate and for providing a signal representative of the steering wheel rate to the control module.

Referring back now to FIGS. 1 and 2, a controlled flow of hydraulic fluid is supplied to the steering valve 20 from a flow control valve 32. In the preferred embodiment, the flow control valve 32 is integrated within the housing of the pump 22. The pump supplies pressurized hydraulic fluid to the flow control valve 32 which returns a controlled amount of fluid to a pump inlet 34 where it joins fluid supplied from a reservoir 36 to regulate the flow supplied to the steering valve 20, thereby providing variable assist power steering.

The position of the flow control valve 32 is controlled by a linear or current proportional actuator or solenoid (not shown). Preferably, the flow control valve 32 includes a ferro-magnetic plunger movably disposed therein and a coil which is energized with electric current in the form of a final control signal. The amount of current supplied to the flow control valve 32 determines the position of the plunger relative to a flow aperture in direct proportion to the current supplied to the solenoid coil. In the presently preferred embodiment, higher current in the solenoid coil increases the flow bypass, reducing the amount of steering assist provided.

The final control signal is generated by the microprocessor based control module 30 using the inlet pressure signal if included, the steering wheel rate signal and the vehicle speed signal and outputting a final desired actuator current value as a function of these inputs, vehicle speed, steering wheel angle and inlet pressure.

Figure 6A:
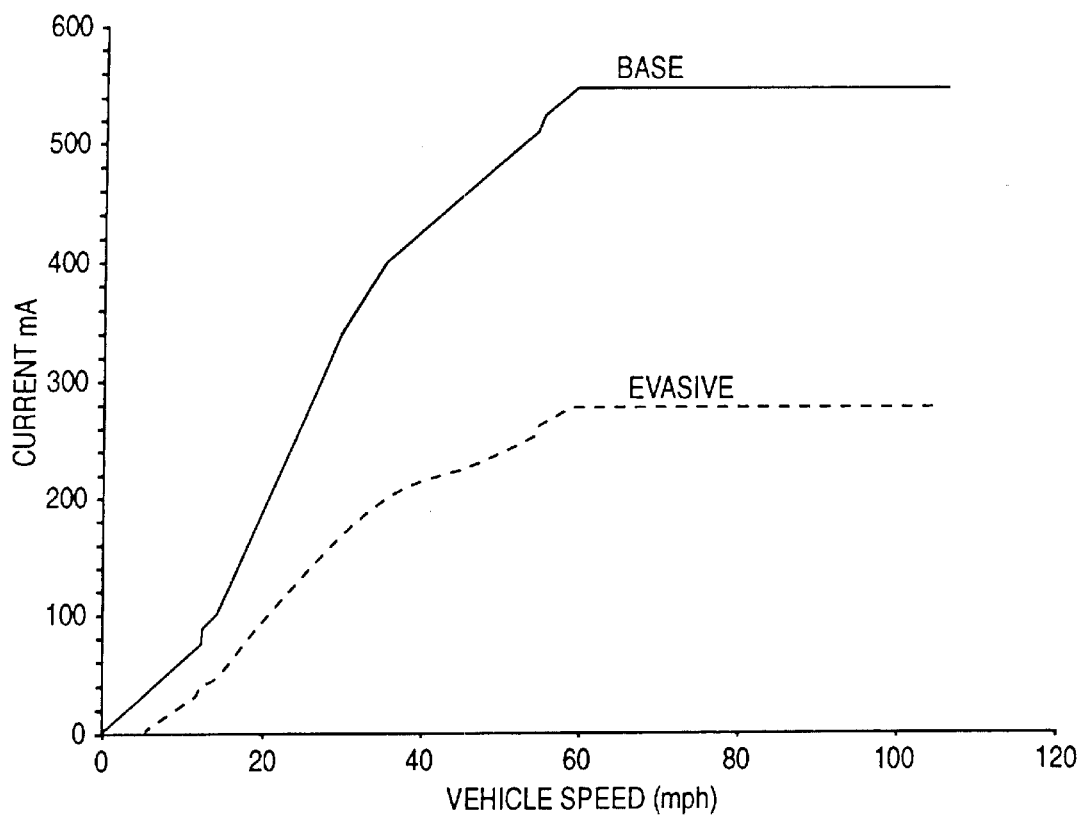
FIG. 6A graphically illustrates first and second calibration tables wherein base and evasive actuator currents are shown as a function of vehicle speed.

Referring now to FIG. 2, the control module 30 includes a first calibration table 38 containing entries representing base actuator current values for given vehicle speeds. A second calibration table 40 contains entries representing evasive actuator current values for given vehicle speeds. FIG. 6A is a graphical representation of the base and evasive actuator current values plotted against vehicle speed.

Figure 6B:
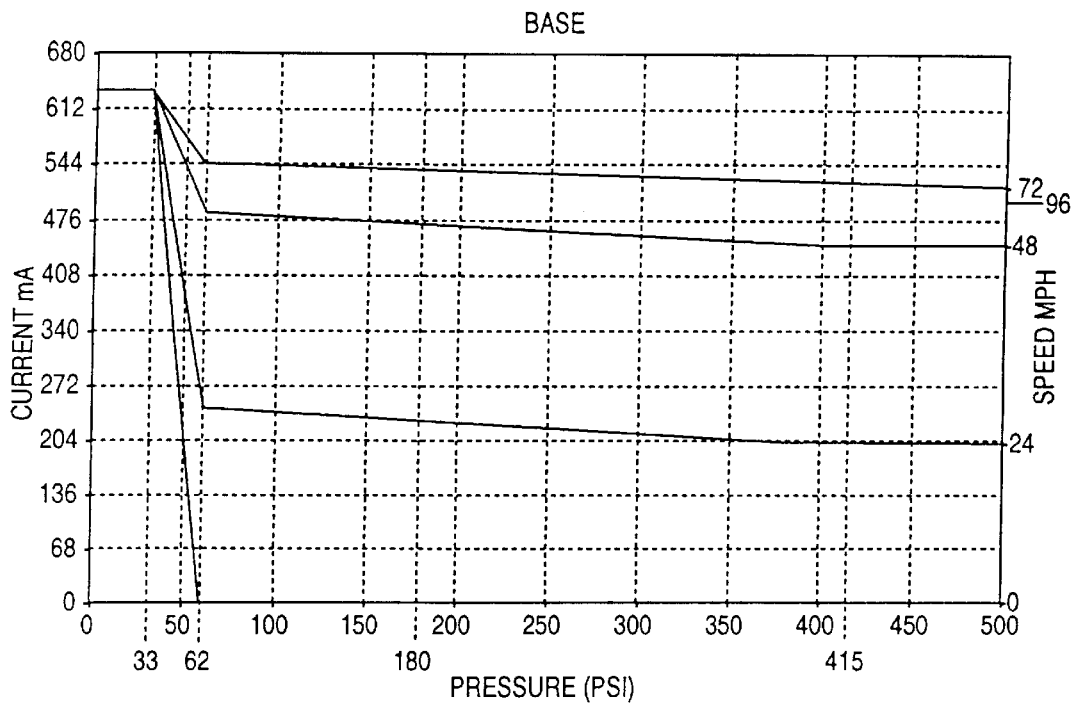
FIG. 6B graphically illustrates a first calibration table wherein base actuator current is shown as a function of both vehicle speed and steering system fluid pressure.
Figure 6C:
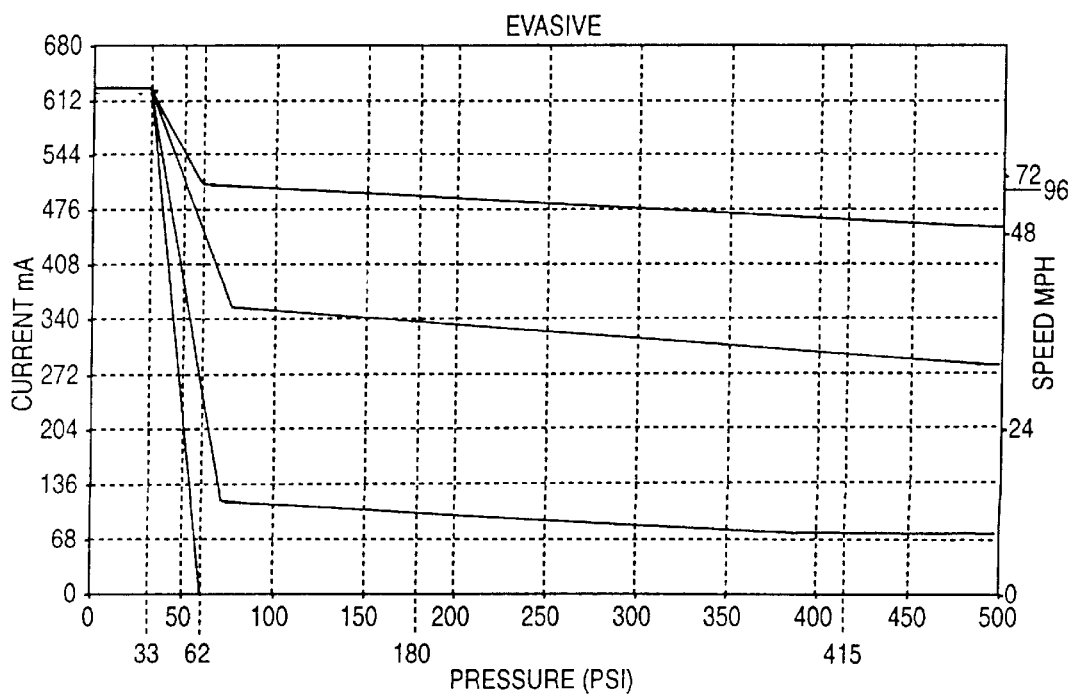
FIG. 6C graphically illustrates a second calibration table wherein evasive actuator current is shown as a function of both vehicle speed and steering system fluid pressure.

In an alternative embodiment, the first and second calibration tables are expanded to include inlet pressure values. FIGS. 6B and 6C illustrate graphical representations of these three dimensional relationships between base and evasive desired actuator current plotted on one axis and inlet pressure plotted on a second axis for several different vehicle speeds represented on a third axis. For any measured value of vehicle speed and inlet pressure, there are associated base and evasive desired actuator current values.

In the simplest implementation of the present invention, the base and evasive desired actuator current values are determined through simple linear interpolation using the vehicle speed as input. The simplest implementation of the three dimensional tables uses bilinear interpolation of the desired actuator current versus vehicle speed and pressure and requires equally spaced points in both directions, speed and pressure, which, in turn, demands extremely large tables for the pressure resolution required. An interpolation table with unequally spaced points could be directly implemented if a fast divide operator was available at reasonable cost, but this is not the case for the inexpensive microprocessors to be used in control module 30 for automotive applications where cost and value must always be considered. Thus, a cost efficient solution is to have equally spaced points versus speed in increments of 24 mph from 0 mph to 96 mph, and to have equally or unequally spaced points versus pressure with the restriction that the distance between any two sequential pressure points be a power of 2 in sensor counts. Powers of 2 in any other units could also be used. This eliminates the need for a divide operator permitting an expensive divide operator to be replaced by much less expensive counted algebraic shifts. Resolution of about 7 psi for table areas with high curvature have been obtained using less than 10 pressure points between 0 psi and 1500 psi because the tables become very flat at high pressures.

With base and evasive desired actuator current values determined for a given vehicle speed and optionally an inlet pressure, the steering wheel rate can be used to determine the final desired actuator current value. In the preferred embodiment, there are four steering wheel rate ranges, defined by three specific steering wheel rate break points. The base range covers steering wheel rate from zero up to a base break point at approximately 30 RPM. A base to evasive steering wheel rate range covers steering wheel rates from the base break point up to an evasive break point at approximately 60 RPM. Next, an evasive to maximum steering wheel rate range covers steering wheel rates ranging from the evasive break point up to a maximum break point. A maximum range covers all steering wheel rates above the maximum break point of approximately 120 RPM. These four ranges, and the break points that define them are used to select the final desired actuator current from the base and evasive desired actuator current values obtained from the calibration tables.

The variable assist power steering system has the ability to adjust steering efforts based on vehicle speed, and steering wheel rate allowing improved steering feel and more consistent efforts for all steering wheel rates. Adding the optional inlet pressure sensor allows the system to reduce assist and corresponding pump flow during straight ahead driving, resulting in lowered parasite losses and increased vehicle efficiency. Several different tables may be preprogrammed and stored in memory in the control module to be selected during vehicle manufacture or while driving.

Figure 5A:
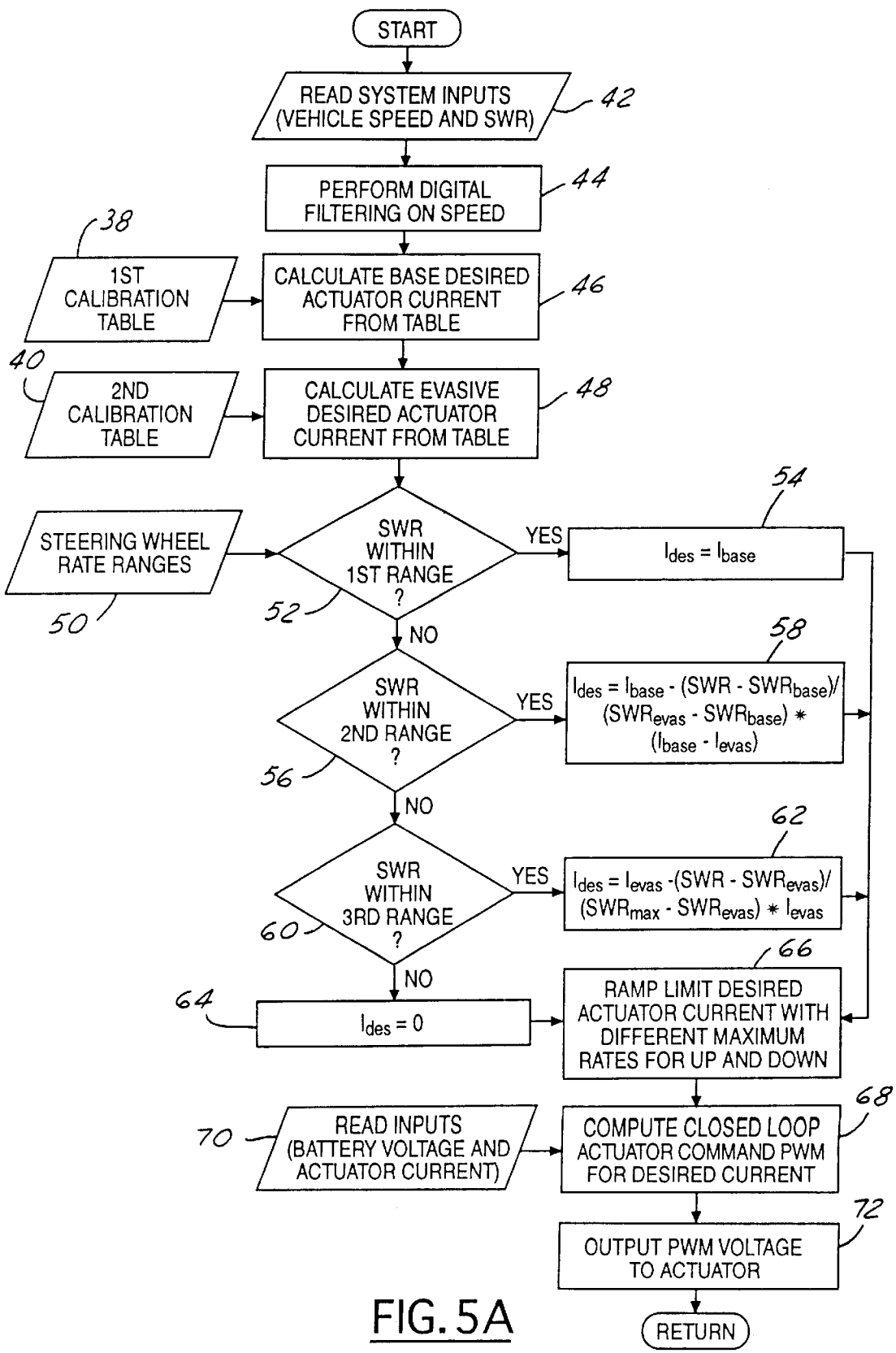
FIG. 5A is a flow chart illustrating a control algorithm for controlling a variable assist power steering system in accordance with one embodiment of the present invention.

FIG. 5A is a flow chart illustrating operation of the variable assist power steering system. The algorithm contains several subroutines that compute and filter vehicle speed and steering wheel rate. It retrieves the base and evasive desired actuator current values from the first and second calibration tables and determines which range the steering wheel rate is in. Depending on the range, the final desired actuator current is determined according to a predetermined formula to ensure sufficient flow of steering fluid to the steering valve 20.

At start up, the vehicle speed and steering wheel rate are read at block 42, along with other system inputs, and conditioned and filtered at block 44. The first calibration table 38 is called up at block 46. The algorithm determines which two entries in the table bound the present vehicle speed, and then interpolates between them to determine the base desired actuator current value. Similarly, at block 48, the second calibration table is called up and the evasive desired actuator current is determined.

At block 50, the algorithm defines the steering wheel rate ranges using the base, evasive and maximum steering wheel rate brake points. At block 52, the algorithm checks to see if the steering wheel rate (SWR) is within the first steering wheel rate range. If yes, then the algorithm proceeds to block 54 and sets the final desired actuator current equal to the base desired actuator current. Otherwise, the algorithm proceeds to block 56 to determine if the steering wheel rate is within the base-evasive steering wheel rate range. If yes, then the present value of the steering wheel rate, SWR, is used to interpolate between the base desired actuator current, $I_{base}$, and the evasive desired actuator current, $I_{evas}$, using the base break point, $SWR_{base}$, and the evasive breakpoint, $SWR_{evas}$, to determine the final desired actuator current, $I_{des}$ at block 58. Otherwise, the algorithm proceeds to block 60 to determine if the steering wheel rate is within the evasive to maximum steering wheel rate range. If yes, then the final desired actuator current is established by interpolation at block 62 using the evasive desired actuator current, $I_{evas}$, and the evasive and maximum steering rate break points. Otherwise, the steering wheel rate must be in excess of the maximum steering rate break point, in which case the final desired actuator current is set equal to zero at block 64 to provide maximum flow to the steering valve.

At block 66, the final desired actuator current is ramp limited to prevent undesirable and noticeable changes in steering assist. In its simplest form, the ramp limit is only applied to increasing values of current. For example, if the difference between the required actuator current and the present actual actuator current is less than or equal to a predetermined ramp limit value, then no limiting is necessary. Otherwise, if the difference exceeds the ramp limit value, the required actuator current is set equal to the sum of the actual actuator current and the ramp limit value. It should be recognized that this example is simplified and it may be desirable to have ramp limiting on decreasing and increasing current values, with the ramp limit values for each possibly being different.

At block 68, the final desired actuator current is then input to block 68 which generates the commanded actuator current using additional inputs from block 70, such as vehicle battery voltage and actual actuator current. Closed loop actuator command PWM for desired current is computed and output to block 72 where the output PWM voltage is applied to the flow control valve actuator to vary steering assist.

Figure 5B:
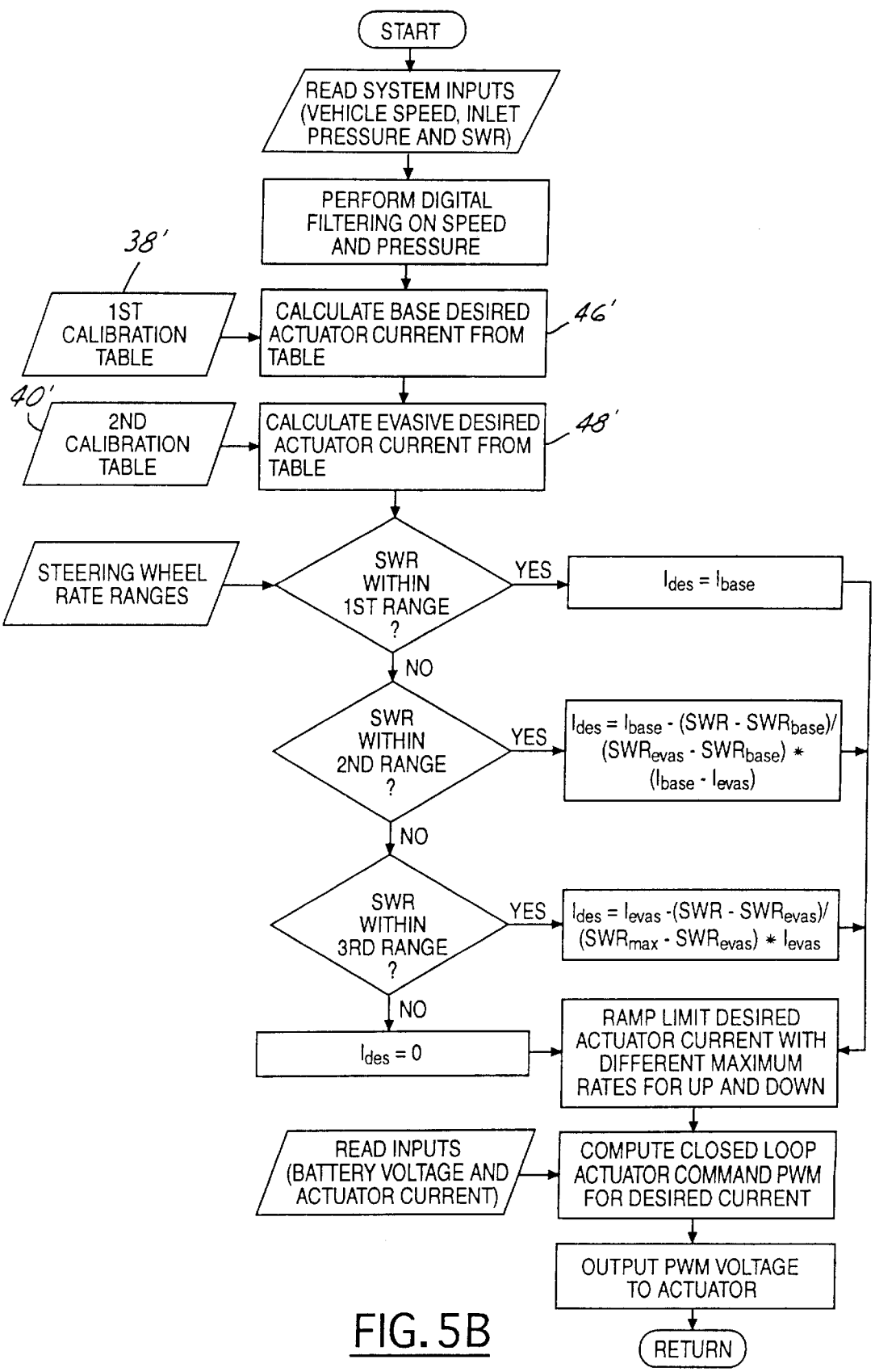
FIG. 5B is a flow chart illustrating a control algorithm for controlling a variable assist power steering system in accordance with an alternative embodiment of the present invention.

FIG. 5B illustrates a flow chart almost identical to that of FIG. 5A, adding the inlet pressure as an input to be used in determining the base and evasive desired actuator current values from the three dimensional first and second calibration tables 38' and 40'. Apart from requiring different interpolation within blocks 46' and 48', it should be recognized that the flow charts are identical. The interpolations required at blocks 46' and 48' are bilinear, as there are four pints to interpolate between, two on either side of the pressure point and two on either side of the vehicle speed. The bilinear interpolation can be done simply by performing two linear interpolations for actuator current versus speed and then linearly interpolate between the results using pressure. Blocks 46' and 48' each will do this to yield base and evasive desired actuator current values for use in the algorithm as described with reference to FIG. 5A.

While the invention has been described with particular reference to the preferred embodiments, it will be understood by those skilled in the art that various changes may be made and equivalents may be substituted for elements of the preferred embodiments without departing from invention. For example, the calibration table need not have equal speed ranges in increments of 24 mph up to 96 mph. There may be equal ranges up to an upper limit based on highway speed limits and a single range above that with minimal power steering assist. This would allow smaller increments than 24 mph or fewer speed points to simplify the table. Additionally, the specific break points set forth herein are meant to be helpful to explain the application of the invention, however, their number and values can be varied considerably while remaining within the scope of the present invention. It is accordingly intended that the claims shall cover all such modifications and applications as do not depart from the true spirit and scope of the invention.

What is claimed is:

1. A method for providing variable assist power steering by controlling a flow control valve actuator for varying steering assist fluid flow in a power steering system for a vehicle, comprising the steps of:

sensing vehicle speed;

sensing steering wheel rate;

sensing actual actuator current;

setting up a first calibration table containing entries representing base actuator current values for given vehicle speeds;

setting up a second calibration table containing entries representing evasive actuator current values for given vehicle speeds;

selecting a base actuator current from said first calibration table as a function of vehicle speed and producing a base desired current value;

selecting an evasive actuator current from said second calibration table as a function of vehicle speed and producing an evasive desired current value;

defining a plurality of steering wheel rate ranges;

selecting a steering wheel rate range as a function of steering wheel rate;

selecting a formula from a plurality of formulas for calculating a final desired current value as a function of steering wheel rate range;

calculating said final desired current value using said selected formula;

computing flow control valve actuator commands using said final desired current value and generating an output PWM voltage signal; and outputting said PWM voltage signal to said flow control valve actuator to vary steering assist.

2. The method of claim 1, wherein said plurality of steering wheel rate ranges includes a base range, a base to evasive range and an evasive to maximum range.

3. The method of claim 2, wherein said formula corresponding to said base steering wheel rate range establishes said final desired actuator current as being equal to said base desired current value from said first table.

4. The method of claim 2, wherein said formula corresponding to said base to evasive range establishes said final desired actuator current as being equal to a first interpolated value determined using said base desired current value from said first table and said evasive desired current value from said second table.

5. The method of claim 2, wherein said formula corresponding to said evasive to maximum range establishes said final desired actuator current as being equal to a second interpolated value determined using said evasive desired current value from said second table.

6. The method of claim 2, wherein said formula when said steering wheel rate exceeds said evasive to maximum range establishes said final desired actuator current as being equal to zero.

7. The method of claim 1, further comprises the step of limiting positive and negative changes of said final desired actuator current within predetermined rates of positive and negative change.

8. A method for providing variable assist power steering by controlling a flow control valve actuator for varying steering assist fluid flow in a power steering system for a vehicle, comprising the steps of:

sensing vehicle speed;

sensing steering wheel rate;

sensing actual actuator current;

setting up a first calibration table containing entries representing base actuator current values for given vehicle speeds;

setting up a second calibration table containing entries representing evasive actuator current values for given vehicle speeds;

selecting a base actuator current from said first calibration table as a function of vehicle speed and producing a base desired current value;

selecting an evasive actuator current from said second calibration table as a function of vehicle speed and producing an evasive desired current value;

defining a plurality of steering wheel rate ranges including a base range, a base to evasive range, an evasive to maximum range, and a exceeds maximum range;

selecting a steering wheel rate range as a function of steering wheel rate;

selecting a formula from a plurality of formulas and calculating a final desired current value as a function of steering wheel rate range;

computing flow control valve actuator commands using said final desired current value and generating an output PWM voltage signal; and outputting said PWM voltage signal to said flow control valve actuator to vary steering assist.

9. The method of claim 8, wherein said formula corresponding to said base steering wheel rate range establishes said final desired actuator current as being equal to said base desired current value from said first table.

10. The method of claim 8, wherein said formula corresponding to said base to evasive range establishes said final desired actuator current as being equal to a first interpolated value determined using said base desired current value from said first table and said evasive desired current value from said second table.

11. The method of claim 8, wherein said formula corresponding to said evasive to maximum range establishes said final desired actuator current as being equal to a second interpolated value determined using said evasive desired current value from said second table.

12. The method of claim 8, wherein said formula when said steering wheel rate exceeds said evasive to maximum range establishes said final desired actuator current as being equal to zero.

13. The method of claim 8, further comprises the step of limiting positive and negative changes of said final desired actuator current within predetermined rates of positive and negative change.

14. A method for providing variable assist power steering by controlling a flow control valve actuator for varying steering assist fluid flow in a power steering system for a vehicle, comprising the steps of:

sensing vehicle speed;

sensing steering wheel rate;

sensing steering assist fluid pressure;

sensing actual actuator current;

setting up a first calibration table containing entries representing base actuator current values for given vehicle speeds and steering assist fluid pressure;

setting up a second calibration table containing entries representing evasive actuator current values for given vehicle speeds and steering assist fluid pressure;

selecting a base actuator current from said first calibration table as a function of vehicle speed and steering assist fluid pressure and producing a base desired current value;

selecting an evasive actuator current from said second calibration table as a function of vehicle speed and steering assist fluid pressure and producing an evasive desired current value;

defining a plurality of steering wheel rate ranges;

selecting a steering wheel rate range as a function of steering wheel rate;

selecting a formula from a plurality of formulas for calculating a final desired current value as a function of steering wheel rate range;

calculating said final desired current value using said selected formula;

computing flow control valve actuator commands using said final desired current value and generating an output PWM voltage signal; and outputting said PWM voltage signal to said flow control valve actuator to vary steering assist.

15. The method of claim 14, wherein said plurality of steering wheel rate ranges includes a base range, a base to evasive range and an evasive to maximum range.

16. The method of claim 15, wherein said formula corresponding to said base steering wheel rate range establishes said final desired actuator current as being equal to said base desired current value from said first table.

17. The method of claim 15, wherein said formula corresponding to said base to evasive range establishes said final desired actuator current as being equal to a first interpolated value determined using said base desired current value from said first table and said evasive desired current value from said second table.

18. The method of claim 15, wherein said formula corresponding to said evasive to maximum range establishes said final desired actuator current as being equal to a second interpolated value determined using said evasive desired current value from said second table.

19. The method of claim 15, wherein said formula when said steering wheel rate exceeds said evasive to maximum range establishes said final desired actuator current as being equal to zero.

20. The method of claim 14, further comprises the step of limiting positive and negative changes of said final desired actuator current within predetermined rates of positive and negative change.

* * * * *